(12) United States Patent
Okano et al.

(10) Patent No.: US 10,549,641 B2
(45) Date of Patent: Feb. 4, 2020

(54) BRAKING DEVICE FOR VEHICLE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Takahiro Okano, Chiryu (JP); Daisuke Nakata, Seto (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 58 days.

(21) Appl. No.: 15/758,553

(22) PCT Filed: Sep. 28, 2016

(86) PCT No.: PCT/JP2016/078590
§ 371 (c)(1),
(2) Date: Mar. 8, 2018

(87) PCT Pub. No.: WO2017/057441
PCT Pub. Date: Apr. 6, 2017

(65) Prior Publication Data
US 2018/0272872 A1 Sep. 27, 2018

(30) Foreign Application Priority Data
Sep. 29, 2015 (JP) .................. 2015-191056

(51) Int. Cl.
*B60L 7/26* (2006.01)
*B60L 7/18* (2006.01)
(Continued)

(52) U.S. Cl.
CPC ........ *B60L 7/26* (2013.01); *B60L 7/18* (2013.01); *B60L 15/2009* (2013.01);
(Continued)

(58) Field of Classification Search
CPC .. B60L 17/26; B60L 50/16; B60L 7/18; B60L 15/2009; B60T 1/10; B60T 8/00; B60T 8/172; B60T 8/3205; B60T 8/4077
(Continued)

(56) References Cited

U.S. PATENT DOCUMENTS

2015/0151729 A1* 6/2015 Yamasoe ............... B60T 7/042
303/122.03
2016/0039292 A1* 2/2016 Takahashi ............ B60W 10/08
701/70
(Continued)

FOREIGN PATENT DOCUMENTS

JP 2010-179840 A 8/2010
JP 2014-015200 A 1/2014
(Continued)

OTHER PUBLICATIONS

JP2014069756NPL.*
(Continued)

Primary Examiner — Yazan A Soofi
(74) Attorney, Agent, or Firm — Buchanan Ingersoll & Rooney PC

(57) ABSTRACT

A braking device for a vehicle includes a friction brake device, a regeneration bake device, a control portion which controls the friction braking force and the regeneration braking force through a cooperative control and a state judging portion which judges whether a vehicle state is in a stopped state or a non-braking operation state where the braking operation is not performed, The control portion executes a factor change control which suppresses an increase of change inclination of the friction braking force by changing a factor relating to a friction used when the hydraulic pressure is converted into the friction braking force to an increasing side and returns the factor to a value at a non-operation of the factor change control when the
(Continued)

vehicle state is judged to be in the stopped state or the non-braking operation state by the state judging portion.

7 Claims, 6 Drawing Sheets

(51) Int. Cl.
    *B60L 15/20*     (2006.01)
    *B60T 8/172*     (2006.01)
    *B60T 13/66*     (2006.01)
    *B60T 13/74*     (2006.01)
    *B60T 8/32*     (2006.01)
    *B60T 8/72*     (2006.01)

(52) U.S. Cl.
    CPC ............ *B60T 8/172* (2013.01); *B60T 8/3205* (2013.01); *B60T 8/72* (2013.01); *B60T 13/662* (2013.01); *B60T 13/74* (2013.01); *B60L 2240/12* (2013.01); *B60L 2240/16* (2013.01); *B60T 2201/02* (2013.01); *B60T 2270/604* (2013.01)

(58) Field of Classification Search
    USPC .......................................................... 701/93
    See application file for complete search history.

(56) References Cited

U.S. PATENT DOCUMENTS

| 2016/0200199 | A1* | 7/2016 | Nakata | ................ | B60T 1/10 |
| | | | | | 303/3 |
| 2016/0264002 | A1* | 9/2016 | Suda | .................. | B60T 1/10 |
| 2018/0134264 | A1* | 5/2018 | Masuda | .................. | B60T 8/00 |

FOREIGN PATENT DOCUMENTS

| JP | 2014-069756 A | | 4/2014 |
| JP | 2014069756FOR | * | 4/2014 |
| JP | 2015-093586 A | | 5/2015 |

OTHER PUBLICATIONS

International Search Report (PCT/ISA/210) dated Nov. 22, 2016, by the Japan Patent Office as the International Searching Authority for International Application No. PCT/JP2016/078590.

Written Opinion (PCT/ISA/237) dated Nov. 22, 2016, by the Japan Patent Office as the International Searching Authority for International Application No. PCT/JP2016/078590.

Office Action (Notification of Reasons for Refusal) dated Apr. 24, 2018, by the Japanese Patent Office in corresponding Japanese Patent Application No. 2015-191056, and an English Translation of the Office Action. (6 pages).

\* cited by examiner

CYLINDER OPENING SIDE ←→ CYLINDER BOTTOM SURFACE SIDE

BRAKING DEVICE FOR VEHICLE

TECHNICAL FIELD

This invention relates to a braking device for a vehicle.

BACKGROUND ART

The braking device for a hybrid vehicle includes a friction brake device which generates friction braking force at the vehicle wheel based on the hydraulic pressure of the wheel cylinder, a regeneration bake device which is formed to be able to generate a regeneration braking force at the vehicle wheel and a control portion which controls the friction braking force and the regeneration braking force through the cooperative control of the friction brake device and the regeneration brake device. The control portion executes switching control which switches the braking force from the regeneration braking force to the friction braking force when the vehicle speed drops during braking operation. This type of the braking device for a vehicle is shown in for example, a Japanese Patent Document JP2010-179840 A.

CITATION LIST

Patent Literature

[Patent Literature 1]JP2010/179840 A

SUMMARY OF INVENTION

Technical Problem(s)

The switching control as explained above is executed in a very short period of time where the vehicle speed is low (the vehicle deceleration period from the switching control starting vehicle speed to the switching control ending vehicle speed). In this period of deceleration, since the braking force is changed from the regeneration braking force which does not depend on the coefficient of friction ($\mu$) of the friction material to the friction braking force which is influenced by the coefficient of friction thereof, the operator of the vehicle may feel the braking operation differently or uncomfortably. The inventors of this application newly recognized and focused on the coefficient of the friction issue. Thus, the objective of the invention is to suppress generation of such different or uncomfortable feeling of the operator of the vehicle upon execution of the switching control.

Accordingly, this invention was made in consideration with the above-mentioned situation and the invention pertains to provide a braking device for a vehicle which can suppress generation of such different or uncomfortable feeling of the operator of the vehicle upon execution of the switching control.

Solution to Problem(s)

The braking device for a vehicle according to the invention is characterized in that the braking device for a vehicle includes a friction brake device which generates a friction braking force at a vehicle wheel based on a hydraulic pressure, a regeneration bake device which is formed to be able to generate a regeneration braking force at the vehicle wheel and a control portion which controls the friction braking force generated by the friction brake device and the regeneration braking force generated by the regeneration brake device through a cooperative control of the friction brake device and the regeneration brake device. In a switching control for switching a braking force from the regeneration braking force to the friction braking force by decreasing the regeneration braking force and at the same time increasing the friction braking force during a braking operation, the control portion executes a factor changing control which suppresses an increase of change inclination of the friction braking force which is actually generated at the vehicle wheel by changing a factor relating to a friction used when the hydraulic pressure is converted into the friction braking force to a side where the friction braking force to be converted is increasing, in response to a reduction in the vehicle speed.

Effect of Invention

Generally, the friction material has the characteristics that the coefficient ($\mu$) of friction rises as the vehicle speed becomes lower from a low speed to an extremely low speed. In other words, when the coefficient of friction increases as the vehicle speed drops, the friction braking force corresponding to the same hydraulic pressure increases. In a vehicle which does not have the regeneration brake device, when the braking operation by the operator of the vehicle (depression on the brake pedal by the operator) is constant, substantially the hydraulic pressure of the wheel cylinder (also referred to simply as "wheel pressure") does not change. Therefore, the actual increase of the friction braking force due to the increase of the coefficient of friction becomes gradual. On the other hand, in a vehicle having the regeneration brake device and executing a switching control, although the braking operation by the operator of the vehicle is constantly performed, since the regeneration braking force decreases, the target friction braking force increases. In other words, the target friction braking force increases in a short period of time from the low vehicle speed to the extremely low vehicle speed. Therefore, in addition to the increase of the actual friction braking force by the switching control, further increase of the actual friction braking force by the change of the coefficient of friction is added upon switching control. Thus, the braking force in total is changed more than expected by the operator thereby to give an uncomfortable feeling to the operator.

According to the invention of this application, a factor relating to the friction is changed so that the converting amount converted from the hydraulic pressure into the friction braking force becomes great upon switching control execution. When the factor relating to the friction is changed in this manner, according to calculations, a hydraulic pressure necessary for achieving the target friction braking force becomes small compared to the hydraulic pressure therefor before changing. In other words, according to the invention, since the hydraulic pressure to be generated becomes small in accordance with the change of the coefficient of friction, the actual friction braking force closely approximates the target friction braking force to make the change of inclination of the actual friction braking force more gradual than the change inclination thereof before the change of the coefficient of friction. Thus, a sudden increase of braking force which may occur upon switching control can be suppressed.

BRIEF EXPLANATION OF ATTACHED DRAWINGS

EMBODIMENTS FOR IMPLEMENTING INVENTION

Hybrid Vehicle

Figure 1:
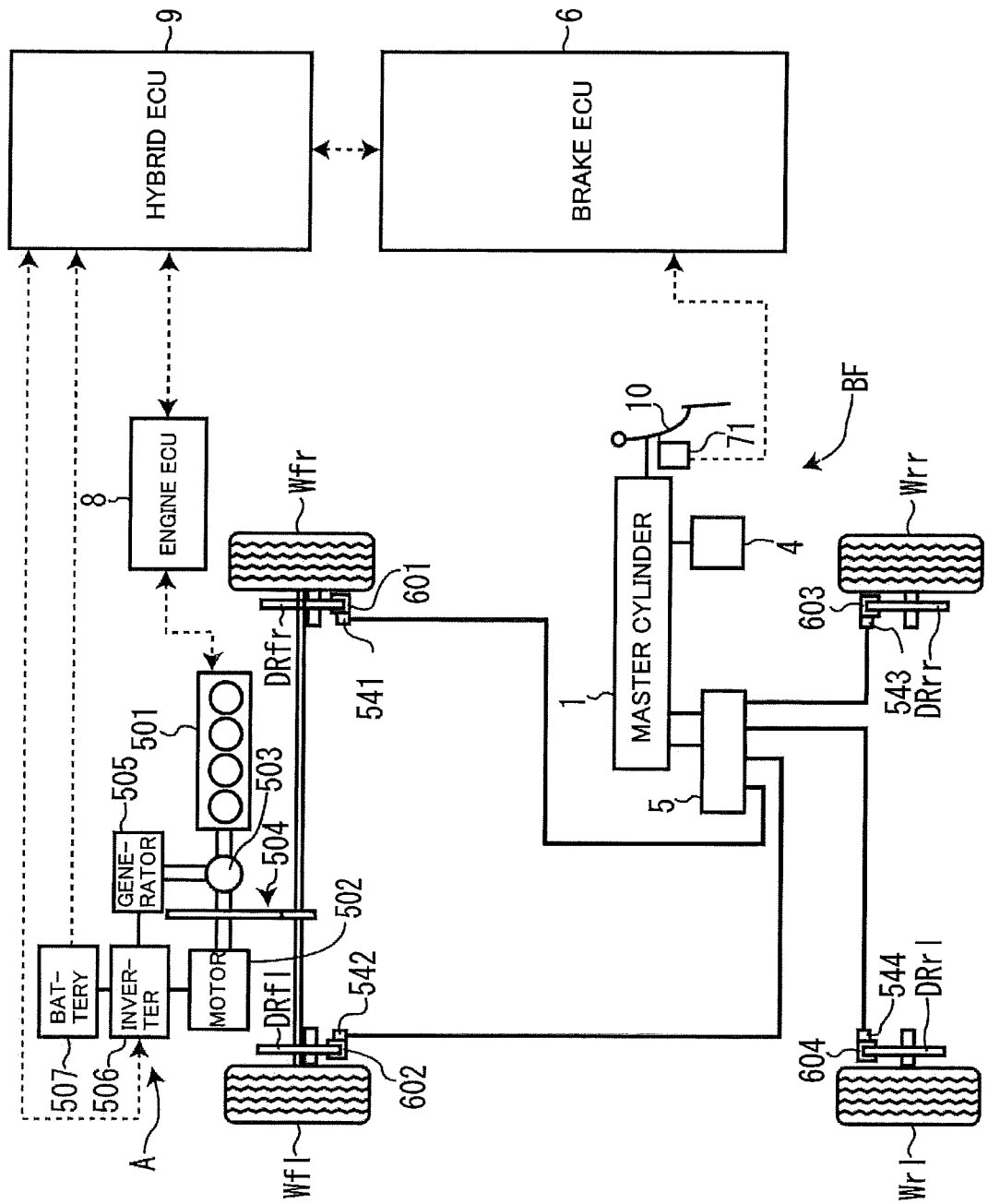
FIG. 1 is an outline schematic view of a hybrid vehicle in which the braking device for a vehicle of one embodiment of the invention is installed.

The embodiment of the invention will be explained hereinafter with reference to the attached drawings. The hybrid vehicle in which the braking device for a vehicle according to the embodiment (hereinafter, simply referred to also as "vehicle") is a vehicle which drives drive wheels, such as for example, right/left front wheels Wfr and Wfl by a hybrid system as shown in FIG. 1. The vehicle includes a brake ECU 6, an engine ECU 8, a hybrid ECU 9, a hydraulic pressure braking force generating device BF, an engine 501, a motor 502, a power dividing mechanism 503, a power transmitting mechanism 504, an inverter 506 and a battery 507.

The driving force of the engine 501 is configured to be transmitted to the drive wheels via the power dividing mechanism 503 and the power transmitting mechanism 504. The driving force of the motor 502 is transmitted to the drive wheels via the power transmitting mechanism 504. The inverter 506 is used for converting the electric voltage between the motor 502 and the generator 505 and the battery 507 as the DC current source. The engine ECU 8 adjusts the driving force of the engine 501 based on the instructions from the hybrid ECU 9. The hybrid ECU 9 controls the motor 502 and the generator 505 through the inverter 506. The hybrid ECU 9 is connected to the battery 507 for watching the charging state of the battery and the charging current thereof.

The regeneration brake device A is structured by the generator 505, the inverter 506 and the battery 507. The regeneration brake device A generates the regeneration braking force generated by the generator 505 at the wheels Wfl and Wfr based on the "executable regeneration braking force" which will be explained later. According to the embodiment shown in FIG. 1, the motor 502 and the generator 505 are formed separately, but the motor and the generator may be integrally formed to be a motor generator.

Neighboring to the positions of the respective wheels Wfl, Wfr, Wrl and Wrr, brake discs DRfl, DRfr, DRrl and DRrr which are rotated integrally with the respective wheels Wfl, Wfr, Wrl and Wrr, and friction brake devices 601, 602, 603 and 604 which generate friction braking force by pushing brake pad (not shown) to the brake discs DRfl, DRfr, DRrl and DRrr are provided. The wheel cylinders 541, 542, 543 and 544 which generate hydraulic pressure (wheel pressure) based on the master pressure generated at the master cylinder 1 and push the brake pad to the brake discs DRfl, DRfr, DRrl and DRrr are provided at the respective friction brake devices 601 through 604.

The stroke sensor 71 detects the operating amount of the brake pedal 10 (stroke amount) and outputs the detected signal to the brake ECU 6. The brake ECU 6 calculates the "required braking force" required by the operator of the vehicle based on the detected signal outputted from the stroke sensor 71. The brake ECU 6 calculates the "target regeneration braking force" from the "required braking force" and outputs the calculated "target regeneration braking force" to the hybrid ECU 9. The hybrid ECU 9 calculates the "executable regeneration braking force" based on the "target regeneration braking force" and outputs the "executable regeneration braking force" to the brake ECU 6. The brake ECU 6 and the hybrid ECU 9 correspond to the "control portion". The braking device for the vehicle according to the embodiment is structured at least the friction brake devices 601 through 604, regeneration brake device A, the brake ECU 6 and the hybrid ECU 9.

Hydraulic Pressure Braking Force Generating Device BF

Figure 2:
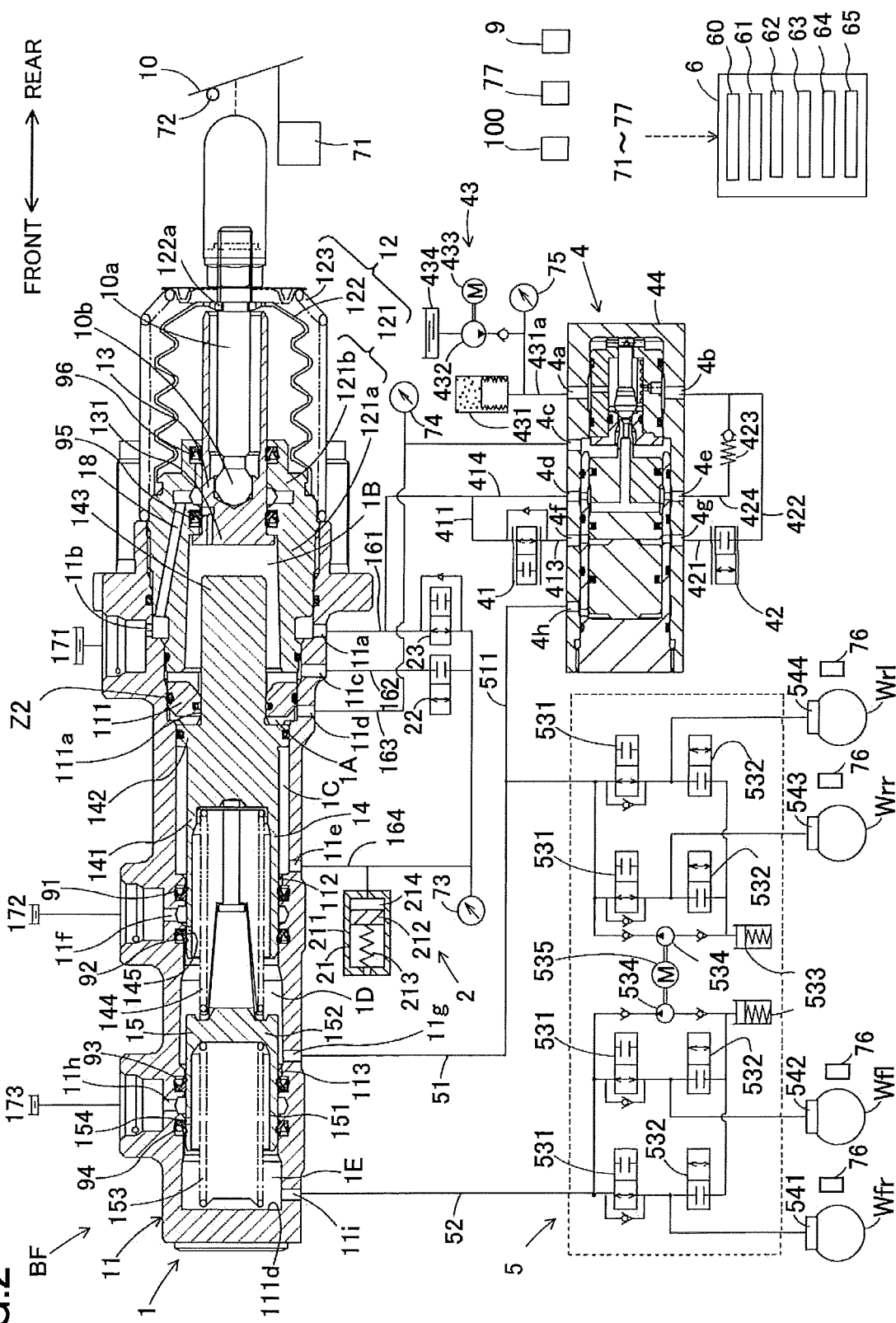
FIG. 2 is an explanatory cross-sectional view showing a portion of the braking device for the vehicle of the embodiment.

The hydraulic pressure braking force generating device BF is formed as shown in FIG. 2, by a master cylinder 1, a reaction force generating device 2, a first control valve 22, a second control valve 23, a servo pressure generating device 4, an actuator 5 wheel cylinders 541 through 544 and various sensors 71 through 77.

Master Cylinder 1

The master cylinder 1 is a portion which supplies the actuator 5 with an operating fluid in response to the operating amount of a brake pedal (brake operating member) 10 and is formed by a main cylinder 11, a cover cylinder 12, an input piston 13, a first master piston 14 and a second master piston 15 and so on. The brake pedal 10 may be of any type of brake operating means that can perform braking operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion in front and rearward direction. The main cylinder 11 is provided therein at portions closer to the front end than the inner wall portion 111 with a small diameter portion 112 (rearward) and a small diameter portion 113 (frontward), each of which inner diameter is set to be slightly smaller. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121*a* of the cylindrical portion 121 is formed to be greater than an inner diameter of the through hole 111*a* of the inner wall portion 111. Further, the inner diameter of the rear portion 121*b* is formed to be smaller than the inner diameter of the front portion 121*a*.

The dust prevention purpose boots 122 is in a tubular bellow shape and is extendible or compressible in front and rearward directions. The front side of the boots 122 is assembled to be in contact with the rear end side opening of the cylindrical portion 121. A through hole 122*a* is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122*a* of the boots 122. The rear end of the boots 122 and the rear end of the compression spring 123 are connected to an operating rod 10*a*. The compression spring 123 biases the operating rod 10*a* in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121*b* of the cylindrical portion 121 and is slidably and fluid-tightly movable in an axial direction and the bottom wall 131 is assembled into an inner peripheral side of the front portion 121*a* of the cylindrical portion 121.

The operating rod 10*a* operable in association with the brake pedal 10 is arranged inside of the input piston 13. A pivot 10*b* is provided at a tip end of the operating rod 10*a* so that the pivot 10*b* can push the input piston 13 toward front side. The rear end of the operating rod 10*a* projects towards outside through the rear side opening of the input piston 13 and the through hole 122*a* of the boots 122, and is connected to the brake pedal 10. The operating rod 10*a* moves in response to the depression operation of the brake pedal 10. More specifically, when the brake pedal 10 is depressed, the operating rod 10*a* advances in a forward direction, while compressing the boots 122 and the compression spring 123 in the axial direction. The input piston 13 also advances in response to the forward movement of the operating rod 10*a*.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111*a* of the inner wall portion 111. The rear end of the projection portion 143 projects into an inner space of the cylindrical portion 121, passing through the through hole 111*a* and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side (front end surface, inner peripheral surface) of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, a front surface of the small diameter portion 112, a front surface of the inner wall portion 111 and the outer peripheral surface of the first master piston 14. The front end portion and the rear end portion of the flange portion 142 of the first master piston 14 separate the rear chamber into a front portion and a rear portion and a "second hydraulic pressure chamber 1C" is defined at the front side of the rear chamber and a "servo chamber 1A" is defined at the rear side of the rear chamber. The volume of the second hydraulic pressure chamber 1C decreases as the first master piston 14 advances and increases as the first master piston 14 moves backward. Further, a "first hydraulic pressure chamber 1B" is defined by the inner peripheral surface of the main cylinder 11, a rear surface of the inner wall portion 111, an inner peripheral surface (inner peripheral portion) of the front portion 121*a* of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111*d* of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171 (low pressure source).

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

The stroke sensor 71 is a sensor which detects the operating amount (stroke) of the brake pedal 10 operated by a driver of the vehicle and transmits the detected result to the brake ECU 6 (and the hybrid ECU 9). The brake stop switch 72 is a switch which detects whether the brake pedal 10 is depressed or not, using a binary signal and the detected signal is sent to the brake ECU 6.

Reaction Force Generating Device 2

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the rear side direction by a compression spring 213 and a reaction force hydraulic pressure chamber 214 is formed at a location rear side surface of the piston 212. The reaction force hydraulic pressure chamber 214 is connected to the second hydraulic pressure chamber 1C via a conduit 164 and the port 11e, and is connected further to the first control valve 22 and the second control valve 23 via the conduit 164.

First Control Valve 22

The first control valve 22 is an electromagnetic valve which is structured to close under non-energized state and opening and closing operations thereof are controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state where an electricity is not applied and under this state, communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping a constant separation distance therebetween. The first control valve 22 is open under the energized state where an electricity is applied and under such state, the communication between the first hydraulic pressure chamber 1B and the second hydraulic pressure chamber 1C is established. Thus, the volume changes in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

Second Control Valve 23

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the second hydraulic pressure chamber 1C via the port 11e and the conduit 161 is in communication with the reservoir 171 via the port 11a. Accordingly, the second control valve 23 establishes the communication between the second hydraulic pressure chamber 1C and the reservoir 171 under the non-energized state thereby generating no reaction force hydraulic pressure but the second control valve 23 interrupts the communication therebetween under the energized state thereby generating the reaction force hydraulic pressure.

Servo Pressure Generating Device 4

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state (normally open valve) and the flow-rate (or, pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and ports 11a and 11b. The pressure decreasing valve 41 prevents the operating fluid from flowing out of the later described first pilot chamber 4D by closing. It is noted here that reservoir 171 and the reservoir 434 are in fluid communication, although such fluid communication is not shown in the drawing. Further, a reservoir common to both reservoirs 171 and 434 may be used.

The pressure increasing valve 42 is an electromagnetic valve structured to close under a non-energized state (normally closed valve) and the flow-rate (or pressure) thereof is controlled by the brake ECU 6. One end of the pressure increasing valve 42 is connected to the conduit 421 and the other end thereof is connected to the conduit 422. The pressure supplying portion 43 is a portion mainly supplying high pressure operating fluid to the regulator 44. The pressure supplying portion 43 includes an accumulator (high-pressure source) 431, a hydraulic pressure pump 432, a motor 433 and the reservoir 434 and so on The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the operating fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the operating fluid to the accumulator 431 in order to recover a pressure up to the value equal to or more than the predetermined value.

Figure 3:
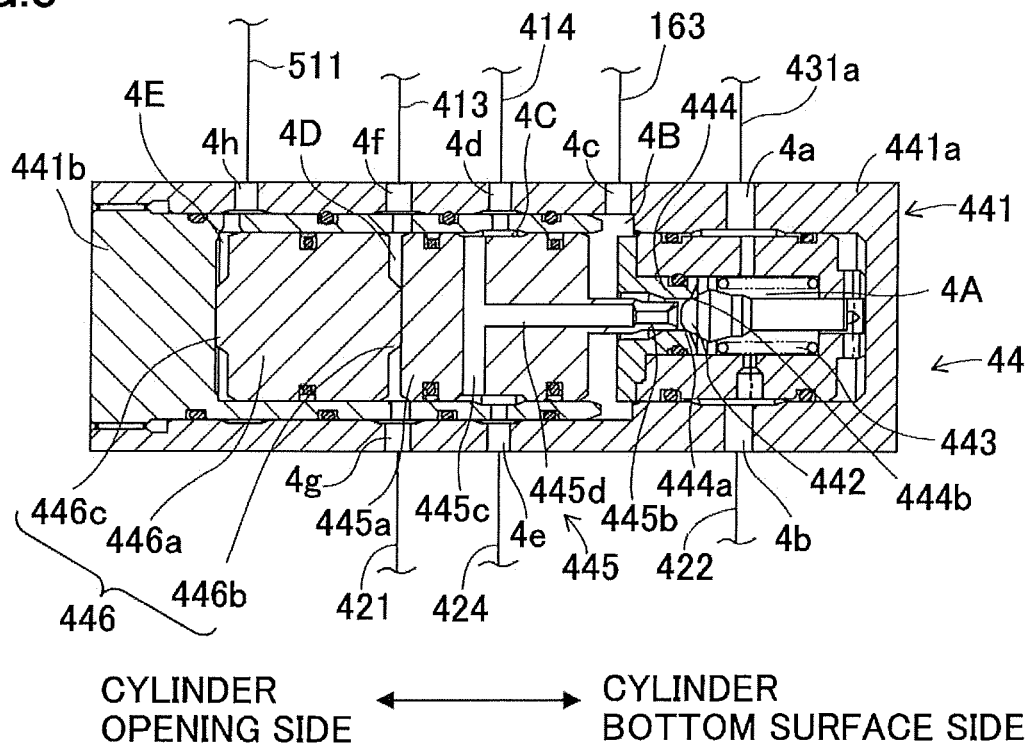
FIG. 3 is a cross-sectional view of the structure of the regulator of the embodiment.

The regulator 44 includes a cylinder 441, a ball valve 442, a biasing portion 443, a valve seat portion 444, a control piston 445 and a sub-piston 446 and so forth as shown in FIG. 3. The cylinder 441 includes a cylinder case 441a formed in a substantially bottomed cylinder-shape having a bottom surface at one end thereof (at the right side in FIG. 3) and a cover member 441b closing an opening of the cylinder case 441a (at the left side thereof in FIG. 3). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4d through 4h provided on the cylinder 441.

The port 4a is connected to the conduit 431a. The port 4b is connected to the conduit 422. The port 4c is connected to a conduit 163. The conduit 163 connects the servo chamber 1A and the port 4c. The port 4d is connected to a reservoir 434 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C, in a state in which the projection portion 445b and the ball valve 442 are not in contact with each other.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction. In addition, a damper mechanism may be provided at the end of the sub piston 446 on the cylinder bottom surface side.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in fluid communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pilot pressure and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing. In other words, the regulator 44 is configured so that the liquid amount corresponding to the difference in pressure between the pilot pressure and the servo pressure flows into or out of the servo chamber 1A.

Actuator 5

The actuator 5 is provided between the first master chamber 1D and the second master chamber 1E which generate the master pressure and the wheel cylinders 541 through 544. The actuator 5 and the first master chamber 1D are in communication through the conduit 51 and the actuator 5 and the second master chamber 1E are in communication through the conduit 52. The actuator 5 adjusts the brake hydraulic pressure to be supplied to the wheel cylinders 541 through 544 based on the instructions from the brake ECU6. The actuator 5 according to the embodiment forms an ABS (anti-lock brake system) for preventing the wheels from locking during braking. Conceptually, the actuator 5 is an anti-lock brake system which is formed at least by a reservoir 533, to which the operating fluid in the wheel cylinders 541 through 544 is discharged, an inlet valve (corresponding to a holding valve 531 which will be explained later) provided between the master chamber 1D, 1E and the wheel cylinders 541 through 544 and an outlet valve (corresponding to a pressure decreasing valve 532 which will be explained later) provided between the wheel cylinders 541 through 544 and the reservoir 533. The actuator 5 is formed with four channel system corresponding to the respective wheel cylinders 541 through 544. Each of the four channels is structured same with one another and accordingly, one of the channels will be explained here as the actuator and explanation of the other channels will be omitted.

The actuator 5 (1 channel) is formed by a holding valve 531, a pressure decreasing valve 532, the reservoir 533, a pump 534 and a motor 535. The holding valve 531 is disposed between the first master chamber 1D and the wheel cylinder 544. The holding valve 531 is an electromagnetic valve and the first opening is connected to the conduit 51 and a second opening is connected to the wheel cylinder 544 and the first opening of the pressure decreasing valve 532. The holding valve 531 is an electromagnetic valve which generates a pressure differential between the both openings and is a normally open valve which becomes an open state under non-energized state. The state of the holding valve 531 is switched over between the two states, one being a communication state in which the both openings are in communication (non-pressure differential state) and the other being a pressure differential state in which a pressure difference is generated between the two openings by the instructions of the brake ECU 6. The pressure differential state can be controllable depending on the magnitude of the control current based on the instructions from the brake ECU6. The pressure decreasing valve 532 is disposed between the wheel cylinder 544 and the reservoir 533b. The pressure decreasing valve 532 establishes or interrupts the fluid communication between the wheel cylinder 544 and the reservoir 533 in response to the instructions from the brake ECU 6. The pressure decreasing valve 532 is a normally open type valve which is in a closed state under a non-energized state.

The reservoir 533 has a hydraulic pressure chamber therein for reserving the operating fluid. The opening of the reservoir 533 is connected to the other opening of the pressure decreasing valve 532 and the pump 534 via conduit. The pump 534 is driven by the motor 535 and returns the operating fluid in the reservoir 533 to the master cylinder 1 side. The motor 535 is driven in response to the instructions from the brake ECU 6.

The function of the actuator 5 will be briefly explained hereinafter. When both the holding valve 531 and the pressure decreasing valve 532 are in non-energized state (normal braking state), the holding valve 531 is in valve opening state and the pressure decreasing valve 532 is in valve closed state. Therefore, the master chambers 1D and 1E are in communication with the wheel cylinders 541 through 544. Under such state, the wheel pressure which corresponds to the hydraulic pressure in the wheel cylinders 541 through 544 is controlled (pressure increase control) in response to the braking operation. Further, when the pressure differential state of the holding valve 531 is controlled, maintaining the pressure decreasing valve 532 to be in the closed state, the wheel pressure is controlled to be increased in response to the controlling state of the holding valve 531. Further, when the holding valve 531 is in the energized state and the pressure decreasing valve 532 is in non-energized state (valve closed state), the wheel pressure is maintained. In other words, in such state, the wheel pressure is controlled to be held. When both of the holding valve 531 and the pressure decreasing valve 532 are in the energized state, the fluid communication between the wheel cylinders 541 through 544 and the reservoir 533 is established to control the wheel pressure to be decreased. By such pressure holding and decreasing controls, the wheel cylinder pressure is controlled not to lock the rotation of wheels of the vehicle. Such wheel pressure control by the actuator 5 is made to each of the wheel cylinders 541 through 544 independently, depending on the situation.

Brake ECU 6

The brake ECU 6 is an electronic control unit and includes a microcomputer. The microcomputer includes an input/output interface, CPU, RAM, ROM and a memory portion such as non-volatile memory, connected with one another through bus communication. The brake ECU 6 is connected to the various sensors 71 through 76 for controlling each of the electromagnetic valves 22, 23, 41 and 42, the motor 433 and the actuator 5 and so on. The operating amount (stroke) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, the reaction force hydraulic pressure of the second hydraulic pressure chamber 1C or the pressure of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels Wfr, Wfl, Wrr and Wrl is inputted to the brake ECU 6 from each of the wheel speed sensors 76. For example, the vehicle speed is calculated based on the detected value of the wheel speed sensor 76. It is noted here that acceleration information, shift information and parking brake (not shown) information (ON-OFF information) are inputted to the brake ECU 6.

Brake Control

The brake ECU 6 and the hybrid ECU 9 control the friction braking force generated by the friction brake device 601 through 604 and the regeneration braking force generated by the regeneration brake device A by a cooperative control between the friction brake device 601 through 604 and the regeneration brake device A. When the brake pedal 10 is depressed, the brake ECU 6 calculates the "required braking force" required by the operator of the vehicle in response to the brake pedal depression operation (for example, value of the stroke sensor 71). Then the brake ECU 6 calculates the "target regeneration braking force" from the "required braking force" and outputs the "target regeneration braking force" to the hybrid ECU 9. The hybrid ECU 9 calculates the "executable regeneration braking force" from the "target regeneration braking force" and outputs the "executable regeneration braking force" to the brake ECU 6. When the braking operation force (for example, reaction hydraulic pressure) of the brake pedal 10 is equal to or less than a predetermined value, the friction braking force is not generated by the friction brake device 601 through 604 until the switching control starts.

The hybrid ECU 9 calculates the "executable regeneration braking force" which is the regeneration braking force that the regeneration brake device A can actually generate considering the vehicle speed, battery charging state and the "target regeneration braking force". The hybrid ECU 9 instructs the regeneration brake device A to generate the generates "executable regeneration braking force".

On the other hand, when the hybrid ECU 9 judges that the "executable regeneration braking force" does not reach the "target regeneration braking force", the brake ECU 6 calculates the "target friction braking force" by subtracting the "executable regeneration braking force" from the "target regeneration braking force". It is noted here that the case that the "executable regeneration braking force" does not reach the "target regeneration braking force" includes the case that the vehicle speed becomes equal to or less than a predetermined speed or the case that the battery 507 is in a substantially fully charged state.

The brake ECU 6 controls the actuator 5 to adjust the wheel pressure thereby to generate the "target friction braking force" at the friction brake device 601 through 604. Therefore, even the "executable regeneration braking force" does not reach the "target regeneration braking force", the actuator 5 is actuated to generate the "target friction braking force" not to change the total braking force which is the sum of the regeneration braking force and the friction braking force.

As explained even when the regeneration braking force is not sufficiently generated at the regeneration brake device A, the actuator 5 adjusts the wheel pressure to generate the friction braking force corresponding to the insufficient regeneration braking force at friction brake device 601 through 604. The brake ECU 6 controls the wheel pressure so that the sum of the executable regeneration braking force and the friction braking force (target friction braking force) becomes equal to the required braking force.

The "friction braking force control" by the brake ECU 6 will be explained hereinafter. The friction braking force control is a control of the servo pressure and so on for generating a targeted friction braking force. In other words, the brake ECU 6 energizes the first control valve 22 to open and the second control valve 23 to close. The fluid communication between the second hydraulic pressure chamber 1C and the reservoir 171 is interrupted by the closing of the second control valve 23. The fluid communication between the first hydraulic pressure chamber 1B and the second hydraulic pressure chamber 1C is established by the opening of the first control valve 22. Thus, the friction braking force control corresponds the mode that controls the servo pressure in the servo chamber 1A by controlling the pressure decreasing valve 41 and the pressure increasing valve 42 under the first control valve 22 being in an open state and the second control valve 23 being in a closed state. The first control valve 22 and the second control valve 23 may function as a valve which adjusts the flow-rate of the operating fluid which flows into or out of the first pilot chamber 1D. Under this friction braking control, the brake ECU 6 calculates the required braking force required by the operator of the vehicle from the operating amount (displacement amount of the input piston 13) of the brake pedal 10 detected by the stroke sensor 71 or the operating force of the brake pedal 10 (corresponding to the hydraulic pressure detected by the pressure sensor 73). Then, the target servo pressure is set based on the required braking force and the executable regeneration braking force and the pressure decreasing valve 41 and the pressure increasing valve 42 are controlled so that the actual servo pressure which is the servo pressure measured at the pressure sensor 74 becomes closer to the target servo pressure.

Explaining more in detail, when the brake pedal 10 is not depressed (when the target friction braking force is zero), the ball valve 442 closes the through passage 444*a* of the valve seat portion 444, which is the state as explained above. In addition, the pressure decreasing valve 41 is in the open state and the pressure increasing valve 42 is in the closed state. In other words, the first chamber 4A and the second chamber 4B are separated. The second chamber 4B is in communication with the servo chamber 1A via the conduit 163 to keep the pressure between the second chamber 4B and the servo chamber 1A to be the same level. The second chamber 4B is in communication with the third chamber 4C via the passages 445*c* and 445*d* provided at the control piston 445. Accordingly, the second chamber 4B and the third chamber 4C are in communication with the reservoir 171 via the conduits 414 and 161. The first pilot chamber 4D is closed by the pressure increasing valve 42 at one end and is in communication with the reservoir 171 at the other end via the pressure decreasing valve 41. The pressure in the first pilot chamber 4D and the pressure in the second chamber 4B are kept to the same level. The second plot chamber 4E is in communication with the first master chamber 1D via the conduits 511 and 51 to maintain the pressure to be the same level.

From this state, when the target friction braking force increases, the brake ECU 6 controls the pressure decreasing valve 41 and the pressure increasing valve 42 based on the target servo pressure. In other words, the brake ECU 6 controls the pressure decreasing valve 41 in the valve closing direction and controls the pressure increasing valve 42 in the valve opening direction. By opening the pressure increasing valve 42, the fluid communication between the accumulator 431 and the first pilot chamber 4D is established and by closing the pressure decreasing valve 41, the fluid communication between first pilot chamber 4D and the reservoir 171 is interrupted. By the high pressure operating fluid supplied from the accumulator 431, the pressure in the first pilot chamber 4D increases and by the increase of the pressure in the first pilot chamber 4D, the control piston 445 slidably moves towards the cylinder bottom surface side. Then, the tip end of the projecting portion 445*b* of the control piston 445 is brought into contact with the ball valve 442 to close the passage 445*d* thereby. Thus, the fluid communication between the second chamber 4B and the reservoir 171 is interrupted.

Further movement of the control piston 445 towards the cylinder bottom surface side makes the ball valve 442 move further towards the cylinder bottom surface side by being pushed by the projecting portion 445*b*. Thus, the ball valve 442 finally is separated from the valve seat surface 444*b*. By this separation, the fluid communication between the first chamber 4A and the second chamber 4B is established through the through passage 444*a* of the valve seat portion 444. Since the high pressure operating fluid is supplied in the first chamber 4A from the accumulator 431, the pressure in the second chamber 4B increases due to this fluid communication.

The operation of the brake ECU 6 will be explained without considering the regeneration braking force issue. The brake ECU 6 controls the pressure increasing valve 42 such that the greater the displacement of the input piton 13 (operating amount of the brake pedal 10) detected by the stroke sensor 71, the higher the pilot pressure in the first pilot chamber 4D becomes. At the same time the brake ECU 6 controls pressure decreasing valve 41 to be closed. In other words, the greater the displacement of the input piton 13 (operating amount of the brake pedal 10), the higher the pilot pressure, and accordingly, the servo pressure become. The servo pressure can be obtained by the pressure sensor 74 and can be converted into the pilot pressure.

As the increase of the pressure in the second chamber 4B, the pressure in the servo chamber 1A which is in communication with the second chamber 4B increases. By the increase of the pressure in the servo chamber 1A, the first master piston 14 advances and the pressure in the first master chamber 1D increases. Then, the second master piston 15 also advances to increase the pressure in the second master chamber 1E. By the increase of the pressure in the first master chamber 1D, the high pressure operating fluid is supplied to the actuator 5 and the second pilot chamber 4E. The pressure in the second pilot chamber 4E increases, but since the pressure in the first pilot chamber 4D is also increased, the sub piston 446 does not move. As explained, high pressure (master pressure) operating fluid is introduced into the actuator 5 to generate the wheel pressure to perform braking operation of the vehicle by the friction brake devices 601 through 604. In the "friction braking control", the force which advances the first master piston 14 corresponds to the force corresponding to the servo pressure. When the braking operation is desired to be released, opposite to the above, the pressure decreasing valve is opened and the pressure increasing valve 42 is closed to establish the fluid communication between the reservoir 171 and the first pilot chamber 4D. Thus, the control piston 445 retreats and the state returns to the state before the brake pedal 10 is depressed.

Switching Control, Factor Change Control

Under the regeneration braking force being generated, when the vehicle speed drops, the brake ECU 6 and the hybrid ECU 9 start switching control. The switching control is the control that switches a braking force from the regeneration braking force to the friction braking force by decreasing the regeneration braking force and at the same time increasing the friction braking force during the regeneration braking operation. The vehicle speed when the switching control starts is determined to be equal to or less than a switching allowable vehicle speed in response to the deceleration of the vehicle based on the value obtained by the acceleration sensor 77. The vehicle speed when the switching control ends is determined in advance.

The brake ECU 6 includes as a function, a brake control portion 60 which executes the friction braking control and the switching control, a starting vehicle speed setting portion 61, a factor change portion 62, an allowable value calculating portion 63, a change judging portion 64 and a state judging portion 65. The starting vehicle speed setting portion 61 obtains the vehicle deceleration information from the acceleration sensor 77 and sets "starting vehicle speed" for starting the switching control in response to the deceleration. The starting vehicle speed setting portion 61 sets the starting vehicle speed as the switching allowable vehicle speed when the deceleration is less than a predetermined value and sets the starting vehicle speed which corresponds to the deceleration when the deceleration is equal to or more than the predetermined value. The brake control portion 60 executes the switching control from the set starting vehicle speed communicating with the hybrid ECU 9.

The factor change portion 62 executes the factor change control which suppresses an increase of change inclination of the friction braking force which is actually generated at the vehicle wheel, by changing a factor relating to a friction used when the hydraulic pressure is converted into the friction braking force to a side where the friction braking force to be converted is increasing, in response to a reduction in the vehicle speed. In concrete, the relationship between the "wheel pressure (or the servo pressure)" and the "factor relating to the friction" can be represented by the "target deceleration of the operator of the vehicle (corresponding to the required braking force)" and "vehicle weight". In this embodiment, "factor relating to friction" is referred to as "BEF (Brake Effectiveness Factor)". Generally, the BEF is determined by the coefficient of friction ($\mu$) and the magnitude of self-servo function. For example, when the disc brake is used, there is no self-servo function and accordingly, the BEF and the coefficient of friction ($\mu$) are in a proportional relationship. In other words, the BEF is proportional to the coefficient of friction ($\mu$) of the brake pad.

Figure 4:
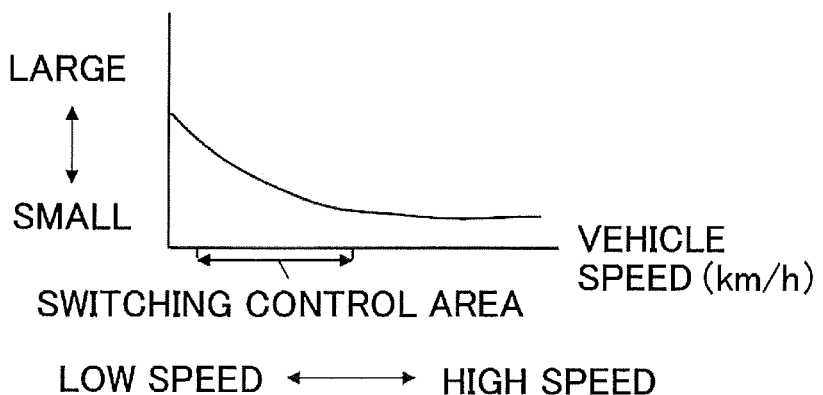
FIG. 4 is an explanatory view explaining the relationship between the coefficient of friction of a friction material and the vehicle speed.

Generally, the coefficient of friction ($\mu$) becomes large, as the vehicle speed becomes low as shown in FIG. 4. When a constant BEF is set regardless of the vehicle speed, the calculated required braking force (executing regeneration braking force+target friction braking force) is maintained during the switching control. However, actually, the difference between the predetermined BEF value and the actual BEF value becomes large as the vehicle speed becomes low and accordingly, the difference between the actual friction braking force and the target friction braking force becomes large. The target friction braking force becomes increasing as the vehicle speed drops upon execution of the switching control. This may generate a sudden change in braking force upon execution of the switching control to give the operator of the vehicle a bad influence (uncomfortable feeling).

Figure 5:
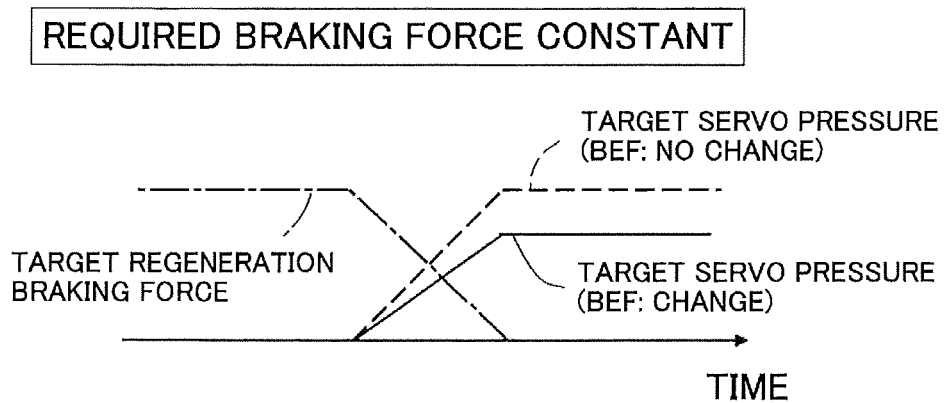
FIG. 5 is an explanatory view explaining the change of the servo pressure at the switching control according to the embodiment.

The factor change portion 62 changes (corrects) the predetermined BEF value towards the increasing side, for example, to agree to the change of the coefficient of friction ($\mu$) shown in FIG. 4, so that the calculated friction braking force approximates the actual friction braking force upon the switching control. By increasing the BEF value, the calculated target servo pressure (or the target wheel pressure) becomes small relative to the same required braking force. In other words, as shown in FIG. 5, the increase amount of the target servo pressure (or the target wheel pressure) relative to the required braking force upon switching control becomes small compared to the amount before changing of the BEF value.

Figure 6:
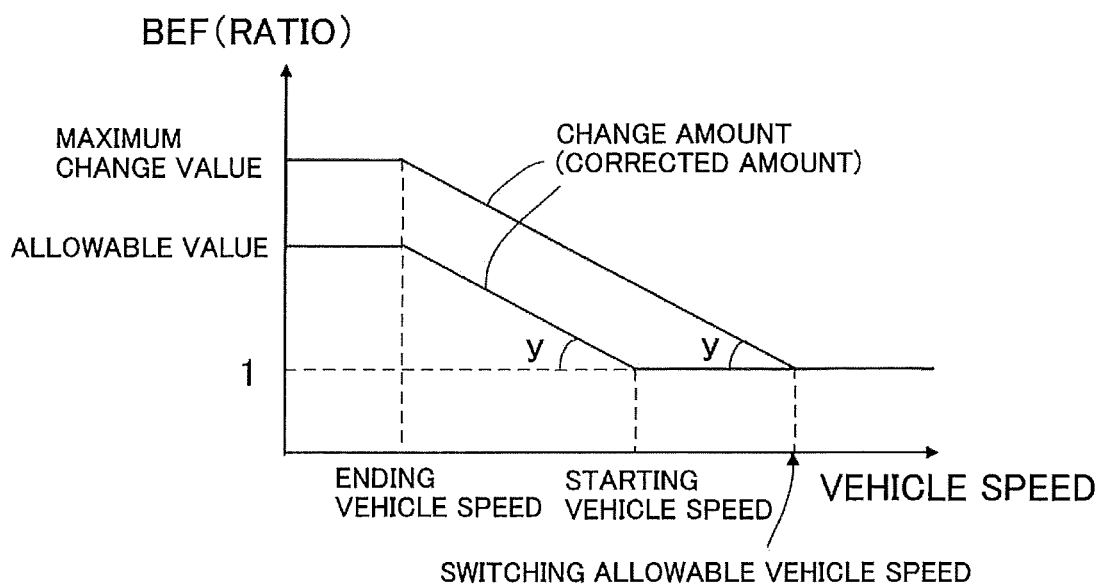
FIG. 6 is an explanatory view explaining an allowable value of the change amount of BEF according to the embodiment.

According to the embodiment, the "maximum change value" of the BEF that is changed by the factor change portion 62 is determined in advance. The maximum change value is the maximum value of the BEF after the change and corresponds to the maximum value of the BEF after the change at the switching control ending vehicle speed. The factor change portion 62 does not change the value which exceeds the maximum change value. As shown in FIG. 6, the factor change portion 62 changes the BEF to increase gradually (here in this embodiment, linearly) towards the maximum change value in response to the drop of the vehicle speed when the switching control is executed at the switching allowable vehicle speed (maximum value of the starting vehicle speed). In FIG. 6, the value of BEF before change (set value) is represented as "1".

The allowable value calculating portion 63 calculates the allowable value of the change amount of BEF (allowable BEF value) that is changed by the factor change portion 62. The allowable value calculating portion 63 obtains the information on the starting vehicle speed from the starting vehicle setting portion 61 and calculates the allowable value based on the starting vehicle speed and the maximum change value. In concrete, the allowable value is set based on the inclination of the function which increases as a linear function from the value "1" (set value) to the maximum change value from the switching allowable vehicle speed to the ending vehicle speed. In other words, the allowable value is represented as the BEF value at the ending vehicle speed when the BEF is increased from the starting vehicle speed to the ending vehicle speed with the inclination "y". The allowable value calculating portion 63 sends the calculated allowable value to the factor change portion 62. The factor change portion 62 changes the BEF value so that the BEF does not exceed the allowable value received from the allowable value setting portion 63 and at the same time the BEF value becomes the allowable value at the ending vehicle speed in response to the vehicle speed (at a predetermined ratio: inclination "y"). The factor change portion 62 may change the BEF value so that the BEF does not exceed the allowable value received from the allowable value setting portion 63 and at the same time becomes the value equal to or less than the allowable value at the ending vehicle speed.

The change judging portion 64 judges whether or not the change of the factor is permitted (whether or not the execution of factor change control is permitted) based on the "hydraulic pressure converted value of the regeneration braking force at the starting of the switching control (hereinafter referred to as regeneration amount hydraulic pressure converted value)" and the "servo pressure at the pressure increase requiring starting time relative to the servo pressure at the switching control (hereinafter referred to as servo pressure Ps)". The factor change portion 62 changes the BEF value (execute the factor change control) when the judgement result indicates the "change permitted" and does not change the BEF value (does not execute the factor change control) when the judgment result indicates the "change prohibited". The change judging portion 64 judges whether the change is permitted or not based on the magnitude relationship between the "value based on the regeneration amount hydraulic pressure converted value" and the "value based on the servo pressure Ps".

The change judging portion 64 judges that the "change is prohibited" when the "value based on the servo pressure Ps" is equal to or larger than the "value based on the regeneration amount hydraulic pressure converted value" and judges that the "change is permitted" when the "value based on the servo pressure Ps" is less than the "value based on the regeneration amount hydraulic pressure converted value".

The judgement of the change judging portion 64 will be conceptually explained hereinafter. The "value based on the servo pressure Ps" corresponds to the "hydraulic pressure change amount which changes in response to the change of the BEF value (change hydraulic pressure amount)" and the "value based on the regeneration amount hydraulic pressure converted value" corresponds to the "hydraulic pressure amount (regeneration hydraulic pressure amount) which changes when the regeneration braking force changes to the value zero (0)". The regeneration hydraulic pressure amount becomes zero (0) upon the switching control and accordingly, when the change hydraulic pressure amount is greater than the regeneration hydraulic pressure amount, the servo pressure is said to be decreased at the ending of the switching control compared to the amount at the starting thereof.

As explained, the change judging portion 64 judges whether the switching control can be executable or not so that the servo pressure may not be decreased between before and after the switching control. In other words, the change judging portion 64 prohibits the BEF value change when the value relating to the wheel pressure (here in this embodiment, the servo pressure) at the ending of the switching control is judged to have become smaller than the value thereof at the starting of the switching control. Structurally, the servo pressure is associated with the master pressure and the master pressure is associated with the wheel pressure. Therefore, the servo pressure is said to be associated with the wheel pressure. It is noted here that the change judging portion 64 may be formed to judge that the "change is permitted" when the servo pressure is maintained (change hydraulic pressure amount equals to the regeneration hydraulic pressure amount). According to this embodiment, in this case, the change judging portion 64 judges that the "change is prohibited".

The state judging portion 65 judges the state of the vehicle whether a vehicle is in a stopped state, in a non-braking operation state, or in a vehicle speed increasing state. The non-braking operation state means the state that the braking operation is not performed, i.e., the brake pedal 10 is not depressed by the operator of the vehicle. For example, when the operator of the vehicle releases the brake pedal 10 to stop the braking operation and the vehicle becomes in a creeping state, the state judging portion 65 judges that the vehicle is in the non-braking operation state. The state judging portion 65 obtains the information on the braking operation from the stroke sensor 71 and/or the brake stop switch 72.

The vehicle speed increasing state means that the vehicle speed is increasing regardless of acceleration operation by the operator. For example, when the vehicle is travelling on a down-hill under the operator releasing the foot from the acceleration pedal 100, the vehicle speed becomes increasing. In this case, the state judging portion 65 judges that the vehicle is in the vehicle speed increasing state. The state judging portion 65 may obtain the information on the acceleration operation for example from the another ECU (such as the engine ECU 8). The state judging portion 65 judges that for example the vehicle is in the stopped state when the information from the vehicle wheel sensor 76 indicates that the vehicle speed becomes zero (0). The stopped state may include the state that the shift lever (not shown) is in the parking position or that the parking brake (not shown) is in ON state, other than the state that the vehicle speed is zero (0).

The state judging portion 65 sends the judgment result (detected result) to the factor change portion 62. The factor change portion 62 returns the BEF value to the value before the change when the state of the vehicle is judged to be in the stopped state or in the non-braking operation state by the state judging portion 65. In other words, in this case the factor change portion 62 returns the factor to the value at the non-factor change control operation (at the non-execution of change control) and returns the BEF value gradually to the value before the change when the vehicle state is judged to be the vehicle speed increasing state by the state judging portion 65.

Figure 7:
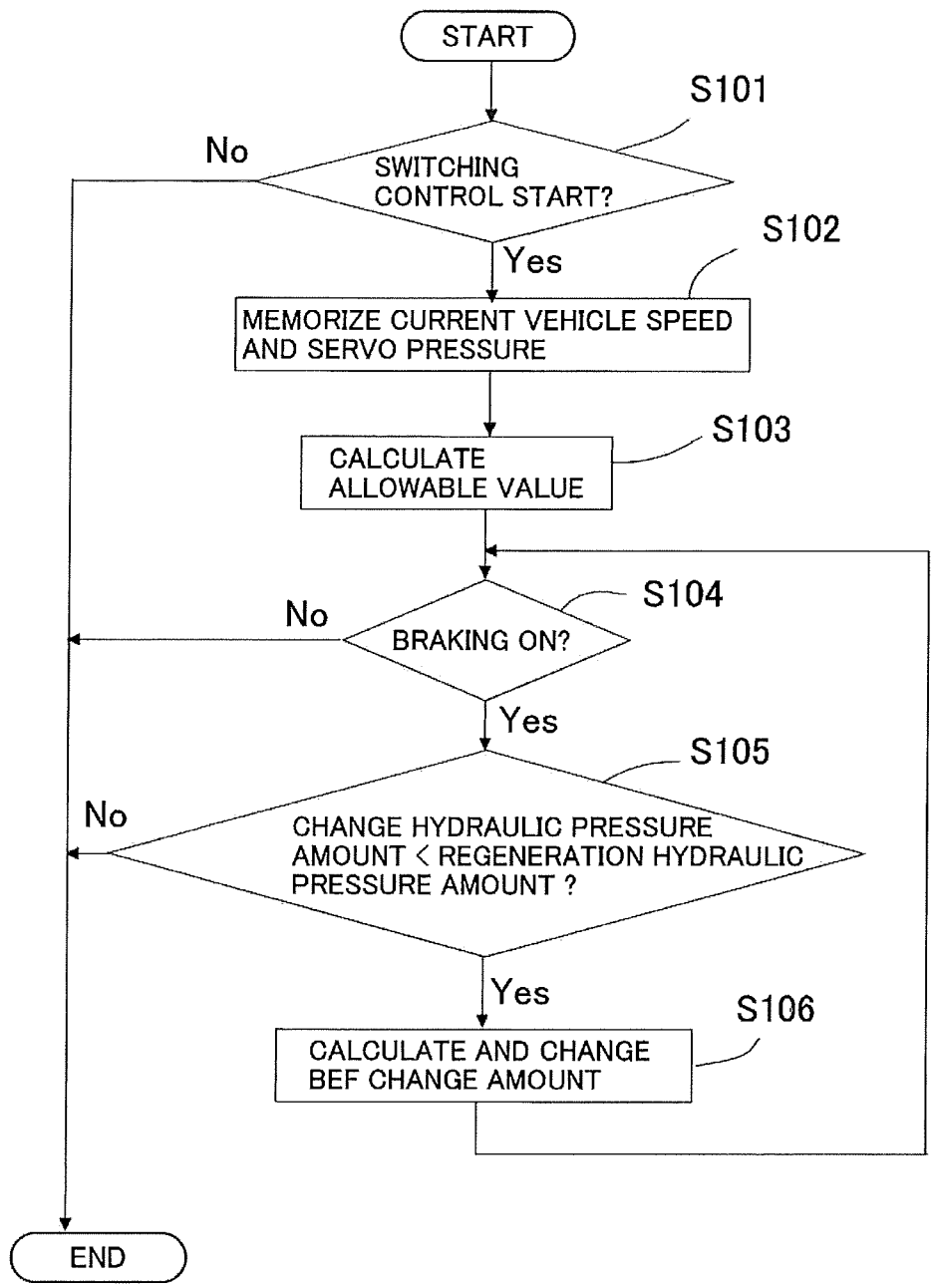
FIG. 7 is a flowchart explaining the flow of the factor change at the switching control according to the embodiment.

The flow of the factor change at the switching control according to the embodiment will be explained hereinafter with reference to FIG. 7. First, when the switching control starts (S101: Yes), the brake ECU 6 starts requiring of the servo pressure increase (pressure increasing control), and at the same time memorizes the "current vehicle speed (the vehicle speed at the starting of the pressure increase requirement)" and the "current servo pressure (servo pressure Ps)" (S102). Then, the allowable value calculating portion 63 calculates the allowable value and sends the calculation result to the change judging portion 64 (S103). Then, the brake ECU 6 judges whether or not the braking operation is ON (under braking operation) (S104). When the braking operation is ON (S104: Yes), the change judging portion 64 judges the magnitude relationship between the "value based on the servo pressure Ps (change hydraulic pressure amount)" and the "value based on the regeneration amount hydraulic pressure converted value (regeneration hydraulic pressure amount)" (S105). When the "change hydraulic pressure amount" is less than the "regeneration hydraulic pressure amount" (S105: Yes), the change judging portion 64 judges that the "change is permitted". The factor change portion 62 calculates the BEF value from the allowable value and the vehicle speed and changes the BEF value to the value corresponding to the calculation result (S106).

On the other hand, after the starting of the switching control (S101: yes), if the braking operation becomes OFF (S104: No), i.e., when the foot of the operator of the vehicle is released from the brake pedal 10, no BEF value change operation is executed by the factor change portion 62. Further, after the starting of the switching control (S101: Yes), and the braking operation is kept ON (S104: Yes), as long as the "change hydraulic pressure amount" is equal to or more than the "regeneration hydraulic pressure amount" (S105: No), the change judging portion 64 judges that the change is prohibited and the factor change portion 62 does not execute the BEF value change. In other words, in this case, the execution of the factor change control is prohibited.

Advantageous Effects

According to the braking device for a vehicle of the embodiment, when the factor change control is executed in the switching control, the factor (here, BEF) associated with the friction is changed so that the converted amount from the value (here, the servo pressure) associated with the wheel pressure to the friction braking force becomes large. Thus, when the BEF value is changed, according to the calculations, the servo pressure required to achieve target friction braking force becomes smaller than before the change. In other words, the target servo pressure becomes small relative to the target friction braking force according to the embodiment, and eventually, as a result, the friction braking force which corresponds to the change of the coefficient of friction can be generated.

Figure 8:
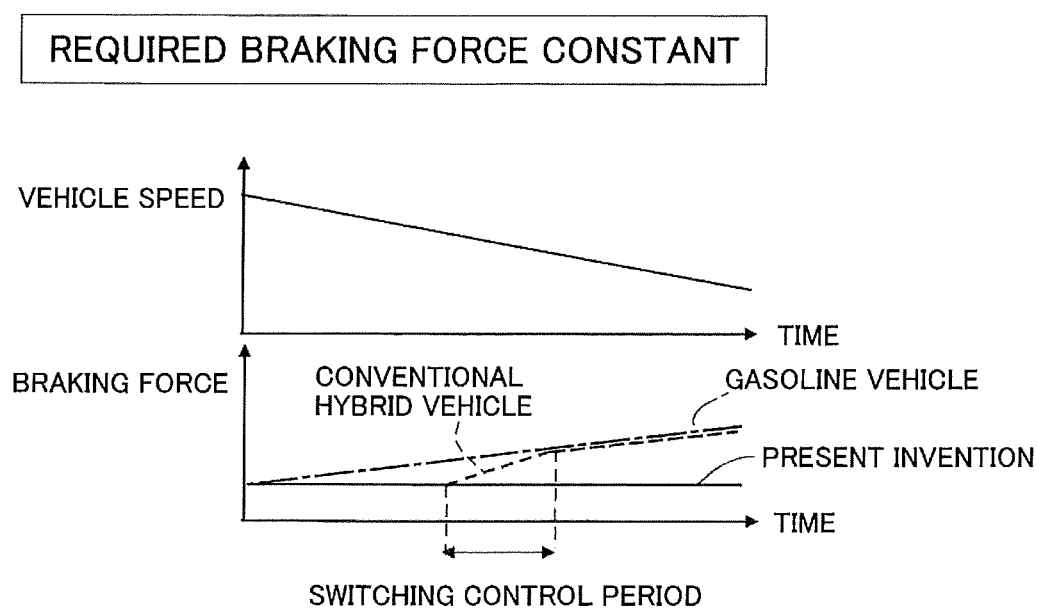
FIG. 8 is an explanatory view explaining the change of actual braking force at the switching control according to the embodiment.

For example, in FIG. 8, in the switching control of a conventional type which does not change the BEF value, although the required braking force is constant, the actual friction braking force increases in a short period of time due to the increase of the target friction braking force and the increase of the coefficient of friction and therefore, the braking force in total increases in a short period of time. However, according to the embodiment, by changing the BEF value, since the influence of the actual friction is considered according to the calculations, actual braking force can be approximated close to the constant value in response to the required braking force which is constant during the switching control. In other words, according to the embodiment, the actual braking force can be approximated to the required braking force during the switching control. According to the embodiment, the change inclination of the actual braking force can be reduced in response to the change inclination of the required braking force which is constant or small during the switching control. By executing the factor change control, the increase of the change inclination of the actual friction braking force can be suppressed. This can suppress a sudden increase of braking force in the switching control and therefore suppress the generation of any uncomfortable feeling by the operator of the vehicle.

Further, according to the embodiment, after changing of the BEF value, when the vehicle state becomes a stopped state or a non-braking operation state, the BEF value is returned to the value before the change (original value). Accordingly, the a normal BEF value is applied in a braking operation other than the switching control. Still further, since the BEF value is returned to the original value under a state that vehicle is stopped or non-braking operation, any bad influence caused by returning the value to the original value is not affected on the braking feeling in the braking operation by the operator.

Further, according to the embodiment, after the changing of the BEF value, when the vehicle becomes a vehicle speed increasing state, the changed BEF value is gradually returned to the original value. Therefore, for example, when the vehicle is travelling on a down-hill, the target servo pressure relative to the required braking force is gradually increased and while gradually increasing the actual braking force, the BEF value can be returned to a normal value BEF. In other words, according to the embodiment, a generation of an influence generated at the time of returning the BEF to the original value on the feeling of the operator of the vehicle can be suppressed.

Further, according to the embodiment, since the changed BEF value becomes equal to or less than the allowable value calculated by the allowable value calculating portion 63, unnecessary reduction of the actual braking force can be prevented and further according to the embodiment, since the change of BEF value is prohibited by the change judging portion 64 based on the hydraulic pressure calculations, the reduction of the servo pressure after the change to the value smaller than the servo pressure before the change can be prevented. Accordingly, the servo pressure reduction during the switching control can be prevented and the generation of insufficiency of the hydraulic pressure or the reduction of reaction can be prevented.

Others

The present invention is not limited to the embodiments explained above. For example, the subject of change by the factor change portion 62 is not limited to the BEF value and any factors which are associated with the friction will be applicable. For example, the coefficient of friction can be applied. Further, the structure which generates the servo pressure is not limited to the structure having the high pressure source and the electromagnetic valves and the structure formed by the electric booster (for example, the system which operates the regulator by a motor) can be applied. The structure of ball valve in the regulator 44 may be changed to a spool type valve structure. Still further, the allowable value calculating portion 63 may calculate the allowable change amount (the factor after change subtracted by the factor before change) as the allowable value or directly calculate the value of the allowable factor itself. These alternative calculations are the same in the meaning.

Summary

The braking device for a vehicle according to the embodiment, can be described as follows. In other words, the braking device for a vehicle according to the embodiment includes a friction brake device 601 through 604 which generates a friction braking force at a vehicle wheel Wfl, Wfr, Wrl and Wrr based on a hydraulic pressure (of the wheel cylinder 541 through 544), a regeneration bake device A which is formed to be able to generate a regeneration braking force at the vehicle wheel Wfl, Wfr, Wrl and Wrr and a control portion 6 and 9 which controls the friction braking force generated by the friction brake device 601 through 604 and the regeneration braking force generated by the regeneration brake device A through a cooperative control of the friction brake device 601 through 604 and the regeneration brake device A. In a switching control for switching a braking force from the regeneration braking force to the friction braking force by decreasing the regeneration braking force and at the same time increasing the friction braking force during a braking operation, the control portion 6 (62) executes a factor change control which suppresses an increase of change inclination of the friction braking force which is generated at the vehicle wheel Wfl, Wfr, Wrl and Wrr by changing a factor relating to a friction used when the hydraulic pressure (of the wheel cylinder 541 through 544)

is converted into the friction braking force to a side where the friction braking force to be converted is increasing, in response to a reduction in the vehicle speed.

The braking device for a vehicle according to the embodiment further includes a state judging portion 65 which judges whether a vehicle state is in a stopped state or a non-braking operation state where the braking operation is not performed and the control portion 6 (62) returns the factor to a value at a non-operation of the factor change control when the vehicle state is judged to be in the stopped state or the non-braking operation state by the state judging portion 65.

The braking device for a vehicle according to the embodiment further includes a state judging portion 65 which judges whether or not a vehicle state is in a vehicle speed increasing state where the vehicle speed is increasing regardless of an accelerating operation and the control portion 6 (62) returns the factor gradually to a value before a change when the vehicle state is judged to be in the vehicle speed increasing state by the state judging portion 65.

The braking device for a vehicle according to the embodiment further includes a starting vehicle speed setting portion 61 which sets a starting vehicle speed which is the vehicle speed at which the switching control starts, based on a deceleration of the vehicle and an allowable value calculating portion 63 which calculates an allowable value of a change amount of a factor corresponding to the vehicle speed, based on an ending vehicle speed at which the switching control ends, a switching allowable vehicle speed which is the maximum vehicle speed that can start the switching control, a maximum change value of the factor and the starting vehicle speed set by the starting vehicle speed setting portion 61 and the control portion 6 (62) changes the factor so that the change amount of the factor becomes a value equal to or less than the allowable value in the factor change control.

The braking device for a vehicle according to the embodiment further includes a change judging portion 64 which prohibits the factor change when a value relating to the hydraulic pressure of the wheel cylinder 541 through 544 at the ending of the switching control is judged to be smaller than a value at the starting thereof and the control portion 6 (62) does not change the factor when the factor change is prohibited by the change judging portion 64.

REFERENCE SIGNS LIST

1; master cylinder, 11; main cylinder, 12; cover cylinder 13; input piston, 14; first master piston, 15; second master piston, 1A; servo chamber, 1B; first hydraulic pressure chamber, 1C; second hydraulic pressure chamber, 1D; first master chamber, 1E; second master chamber, 10; brake pedal, 171; reservoir, 2; reaction force generating device, 22; first control valve, 23; second control valve, 4; servo pressure generating device, 41; pressure decreasing valve, 42; pressure increasing valve, 431; accumulator, 44; regulator, 445; control piston, 4D; first pilot chamber, 5; actuator, 531; holding valve, 532; pressure decreasing valve, 533; reservoir, 541, 542, 543, 544; wheel cylinder, BF; hydraulic braking force generating device, 6; brake ECU (control portion), 60; brake control portion, 61; starting vehicle speed setting portion, 62; factor change portion (control portion), 63; allowable value calculating portion, 64; change judging portion, 65; state judging portion, 601, 602, 603, 604; friction brake device, 71; stroke sensor, 72; brake stop switch, 73, 74, 75; pressure sensor, 76; wheel speed sensor, 77; acceleration sensor, 9; hybrid ECU (control portion), 100; acceleration pedal, A; regeneration brake device, Wfl, Wfr, Wrl, Wrr; vehicle wheel.

The invention claimed is:

1. A braking device for a vehicle comprising:
a friction brake device which generates a friction braking force at a vehicle wheel based on a hydraulic pressure;
a regeneration brake device which is formed to be able to generate a regeneration braking force at the vehicle wheel;
a control portion which controls the friction braking force generated by the friction brake device and the regeneration braking force generated by the regeneration brake device through a cooperative control of the friction brake device and the regeneration brake device; and
a state judging portion which judges whether a vehicle state is in a stopped state or a non-braking operation state where the braking operation is not performed, wherein
in a switching control for switching a braking force from the regeneration braking force to the friction braking force by decreasing the regeneration braking force and at the same time increasing the friction braking force during a braking operation, the control portion executes a factor change control which suppresses an increase of change inclination of the friction braking force which is actually generated at the vehicle wheel, by changing a factor relating to a friction used when the hydraulic pressure is converted into the friction braking force to a side where the friction braking force to be converted is increasing, in response to a reduction in the vehicle speed, and wherein
the control portion returns the factor to a value at a non-operation of the factor change control when the vehicle state is judged to be in the stopped state or the non-braking operation state by the state judging portion.

2. The braking device for a vehicle according to claim 1, further comprising:
a change judging portion which prohibits the factor change when a value relating to the hydraulic pressure at an ending of the switching control is judged to be smaller than a value at a starting thereof, wherein
the control portion does not change the factor when the factor change is prohibited by the change judging portion.

3. A braking device for a vehicle comprising:
a friction brake device which generates a friction braking force at a vehicle wheel based on a hydraulic pressure;
a regeneration brake device which is formed to be able to generate a regeneration braking force at the vehicle wheel;
a control portion which controls the friction braking force generated by the friction brake device and the regeneration braking force generated by the regeneration brake device through a cooperative control of the friction brake device and the regeneration brake device; and
a state judging portion which judges whether or not the vehicle state is in a vehicle speed increasing state where the vehicle speed is increasing regardless of an accelerating operation, wherein
in a switching control for switching a braking force from the regeneration braking force to the friction braking force by decreasing the regeneration braking force and at the same time increasing the friction braking force during a braking operation, the control portion executes a factor change control which suppresses an increase of change inclination of the friction braking force which is actually generated at the vehicle wheel, by changing a factor relating to a friction used when the hydraulic pressure is converted into the friction braking force to a side where the friction braking force to be converted is increasing, in response to a reduction in the vehicle speed, and wherein the control portion returns the factor gradually to a value before a change, when the vehicle state is judged to be in the vehicle speed increasing state by the state judging portion.

4. The braking device for a vehicle according to claim 3, further comprising:

a change judging portion which prohibits the factor change when a value relating to the hydraulic pressure at an ending of the switching control is judged to be smaller than a value at a starting thereof, wherein the control portion does not change the factor when the factor change is prohibited by the change judging portion.

5. A braking device for a vehicle comprising:

a friction brake device which generates a friction braking force at a vehicle wheel based on a hydraulic pressure;

a regeneration brake device which is formed to be able to generate a regeneration braking force at the vehicle wheel; and a control portion which controls the friction braking force generated by the friction brake device and the regeneration braking force generated by the regeneration brake device through a cooperative control of the friction brake device and the regeneration brake device; wherein in a switching control for switching a braking force from the regeneration braking force to the friction braking force by decreasing the regeneration braking force and at the same time increasing the friction braking force during a braking operation, the control portion executes a factor change control which suppresses an increase of change inclination of the friction braking force which is actually generated at the vehicle wheel, by changing a factor relating to a friction used when the hydraulic pressure is converted into the friction braking force to a side where the friction braking force to be converted is increasing, in response to a reduction in the vehicle speed, wherein the braking device for a vehicle further comprising:

a starting vehicle speed setting portion which sets a starting vehicle speed which is a vehicle speed at which the switching control starts; and an allowable value calculating portion which calculates an allowable value of a change amount of the factor based on an ending vehicle speed which is a vehicle speed at which the switching control ends, a switching allowable vehicle speed which is a maximum vehicle speed that can start the switching control, a maximum change value of the factor and the starting vehicle speed set by the starting vehicle speed setting portion, and wherein the control portion changes the factor so that the change amount of the factor becomes a value equal to or less than the allowable value in the factor change control.

6. The braking device for a vehicle according to claim 5, further comprising:

a change judging portion which prohibits the factor change when a value relating to the hydraulic pressure at an ending of the switching control is judged to be smaller than a value at a starting thereof, wherein the control portion does not change the factor when the factor change is prohibited by the change judging portion.

7. A braking device for a vehicle comprising:

a friction brake device which generates a friction braking force at a vehicle wheel based on a hydraulic pressure;

a regeneration brake device which is formed to be able to generate a regeneration braking force at the vehicle wheel; and a control portion which controls the friction braking force generated by the friction brake device and the regeneration braking force generated by the regeneration brake device through a cooperative control of the friction brake device and the regeneration brake device; wherein in a switching control for switching a braking force from the regeneration braking force to the friction braking force by decreasing the regeneration braking force and at the same time increasing the friction braking force during a braking operation, the control portion executes a factor change control which suppresses an increase of change inclination of the friction braking force which is actually generated at the vehicle wheel, by changing a factor relating to a friction used when the hydraulic pressure is converted into the friction braking force to a side where the friction braking force to be converted is increasing, in response to a reduction in the vehicle speed, wherein the braking device for a vehicle further comprising:

a change judging portion which prohibits the factor change when a value relating to the hydraulic pressure at an ending of the switching control is judged to be smaller than a value at a starting thereof, and wherein the control portion does not change the factor when the factor change is prohibited by the change judging portion.

* * * * *